Dec. 6, 1955 M. MARKIN 2,725,921
SEAT STRUCTURE FOR MOTOR VEHICLES, AIRPLANES, AND THE LIKE
Filed Feb. 23, 1952 5 Sheets-Sheet 1

INVENTOR.
Morris Markin
BY
[signature]
ATTORNEY.

Dec. 6, 1955  M. MARKIN  2,725,921
SEAT STRUCTURE FOR MOTOR VEHICLES, AIRPLANES, AND THE LIKE
Filed Feb. 23, 1952  5 Sheets-Sheet 2
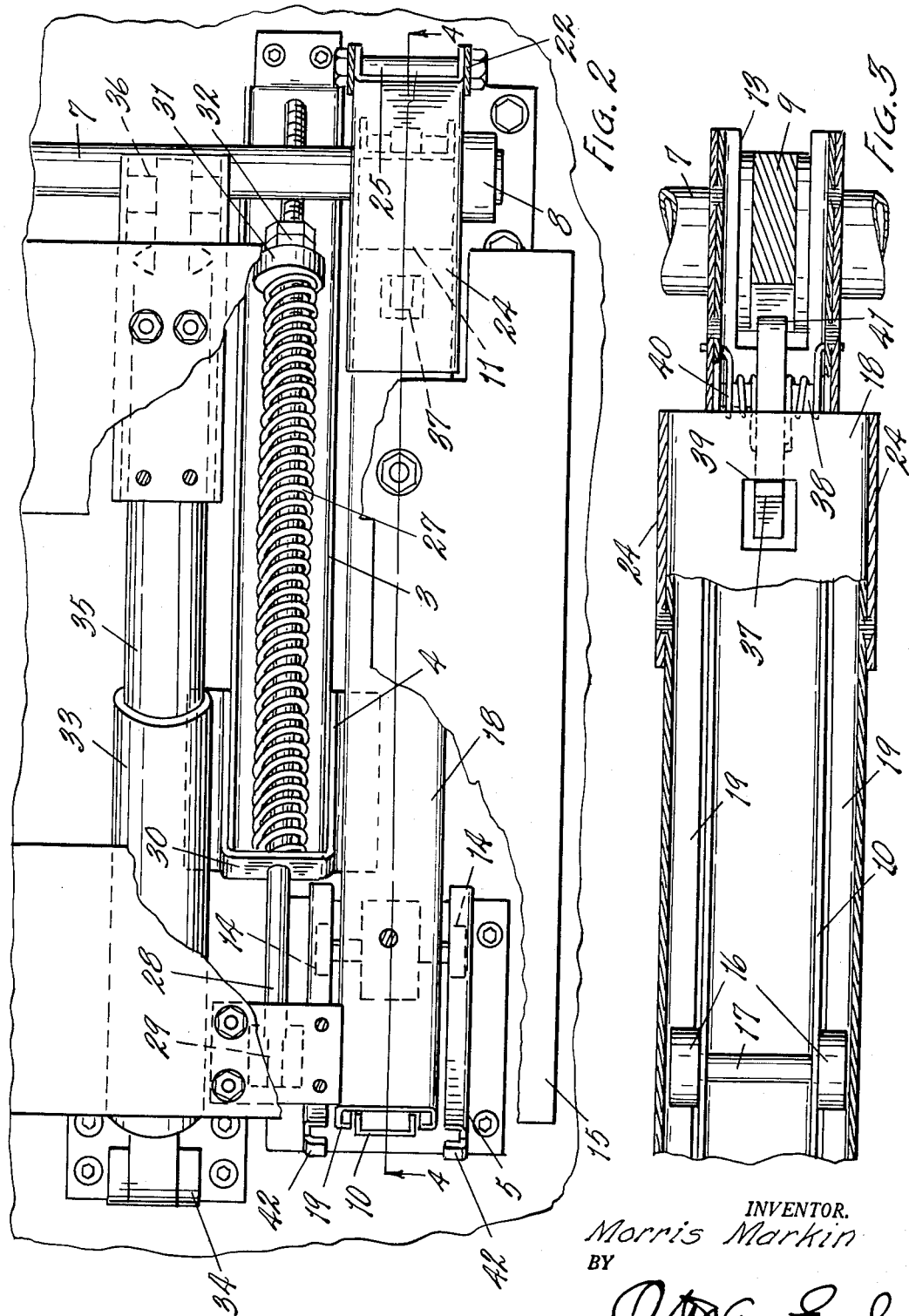
INVENTOR.
Morris Markin
BY
Otto G. Earl
ATTORNEY.

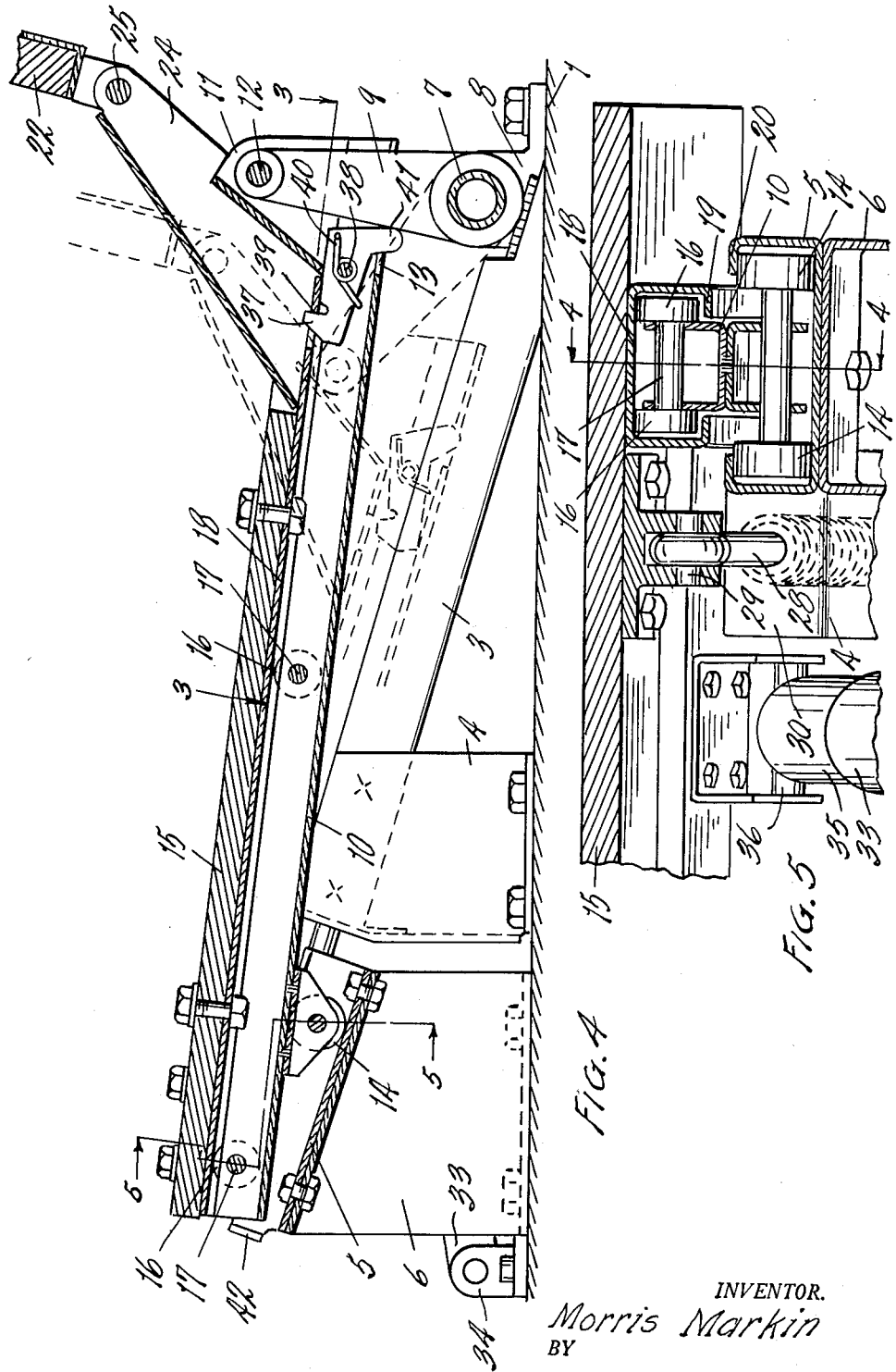

Dec. 6, 1955  M. MARKIN  2,725,921
SEAT STRUCTURE FOR MOTOR VEHICLES, AIRPLANES, AND THE LIKE
Filed Feb. 23, 1952  5 Sheets-Sheet 4
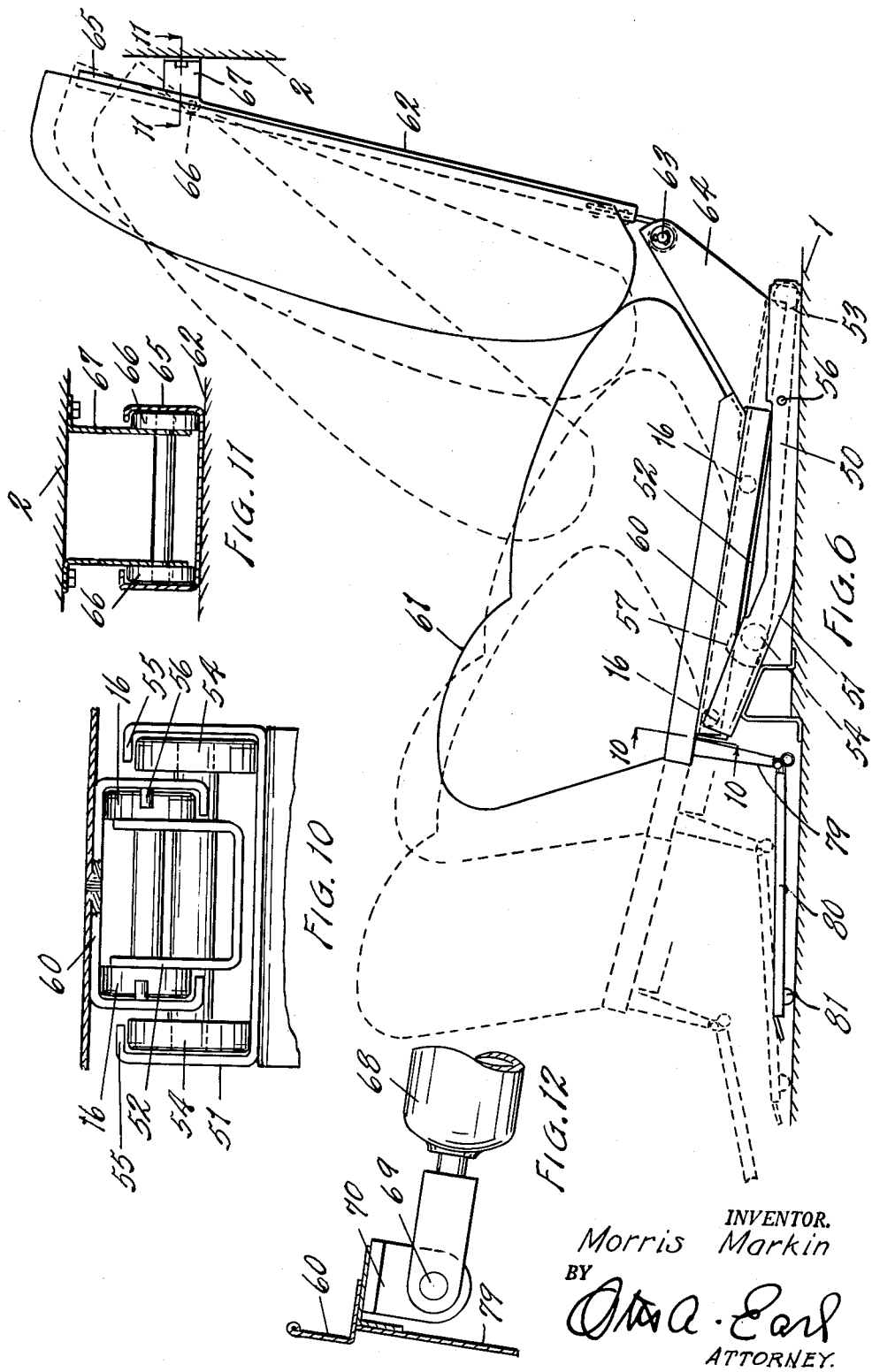
INVENTOR.
Morris Markin
BY
Otis A. Earl
ATTORNEY.

Dec. 6, 1955 M. MARKIN 2,725,921
SEAT STRUCTURE FOR MOTOR VEHICLES, AIRPLANES, AND THE LIKE
Filed Feb. 23, 1952 5 Sheets-Sheet 5
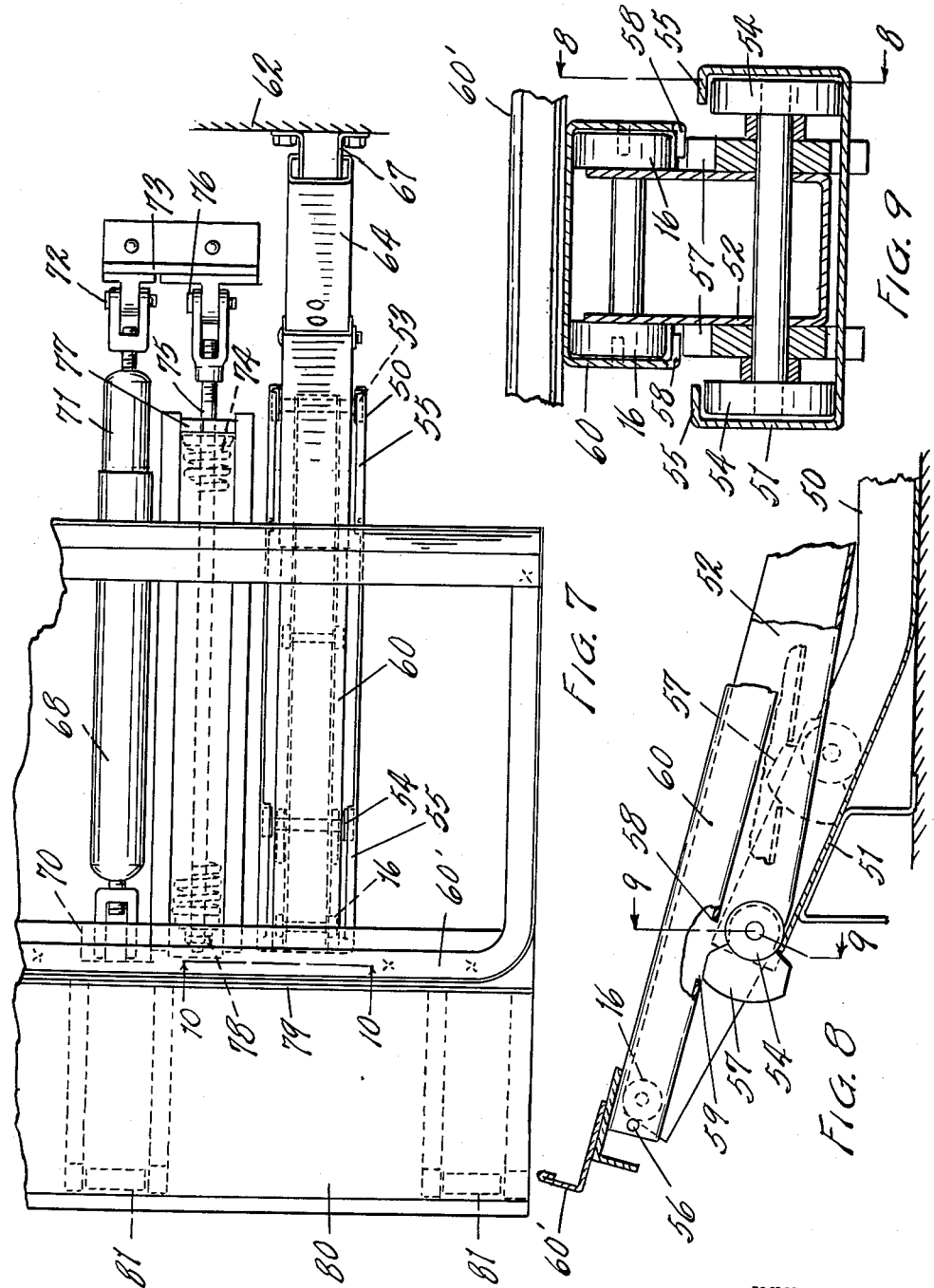
INVENTOR.
Morris Markin
BY
Otis A. Earl
ATTORNEY.

United States Patent Office 2,725,921
Patented Dec. 6, 1955

2,725,921

SEAT STRUCTURE FOR MOTOR VEHICLES, AIRPLANES, AND THE LIKE

Morris Markin, Kalamazoo, Mich., assignor to Checker Cab Manufacturing Corporation, Kalamazoo, Mich.

Application February 23, 1952, Serial No. 273,115

15 Claims. (Cl. 155—9)

This invention relates to improvements in a seat structure for motor vehicles, airplanes and the like.

The main objects of this invention are:

First, to provide a seat structure which minimizes or substantially reduces the impelling force on the occupant due to sudden stopping of the conveyance.

Second, to provide a seat structure having these advantages which may be incorporated in motor vehicles such as taxis, busses, airplanes and the like and one which does not require substantially greater space as compared to a fixed seat.

Third, to provide a combined seat and back structure in which the seat and back are associated and supported so that they maintain substantially their normal angular relation.

Fourth, to provide a seat structure which is tilted rearwardly on the sudden stopping of the conveyance.

Fifth, to provide a structure having these advantages in which the feet of the user are so supported that the feet or legs are not likely to be injured.

Objects relating to details and economies of the invention will appear from the description to follow. The invention is pointed out in the claims.

A preferred embodiment of the invention is illustrated in the accompanying drawings, in which:

Fig. 2 is an enlarged fragmentary plan view, parts being broken away to show certain structural details.

Fig. 3 is an enlarged fragmentary view mainly in section on a line corresponding to line 3—3 of Fig. 4.

Fig. 4 is an enlarged fragmentary view mainly in section on a line corresponding to line 4—4 of Figs. 2 and 5.

Fig. 5 is an enlarged fragmentary view on a line corresponding to the broken line 5—5 of Fig. 4.

Fig. 6 is a fragmentary side elevational view of a modified form or embodiment of the invention, parts being shown in fully retracted position by full lines and in intermediate and fully advanced positions by dotted lines.

Fig. 7 is a fragmentary plan view of the structure shown in Fig. 6.

Fig. 8 is an enlarged fragmentary view partially in section on a line corresponding to line 8—8 of Fig. 9.

Fig. 9 is an enlarged fragmentary view partially in section on the broken line 9—9 of Fig. 8.

Fig. 10 is an enlarged fragmentary view partially in section on line 10—10 of Fig. 7.

Fig. 11 is an enlarged fragmentary view on a line corresponding to line 11—11 of Fig. 6 showing details of the back member mounting.

Fig. 12 is an enlarged fragmentary view showing details of the shock absorber.

Figure 1:
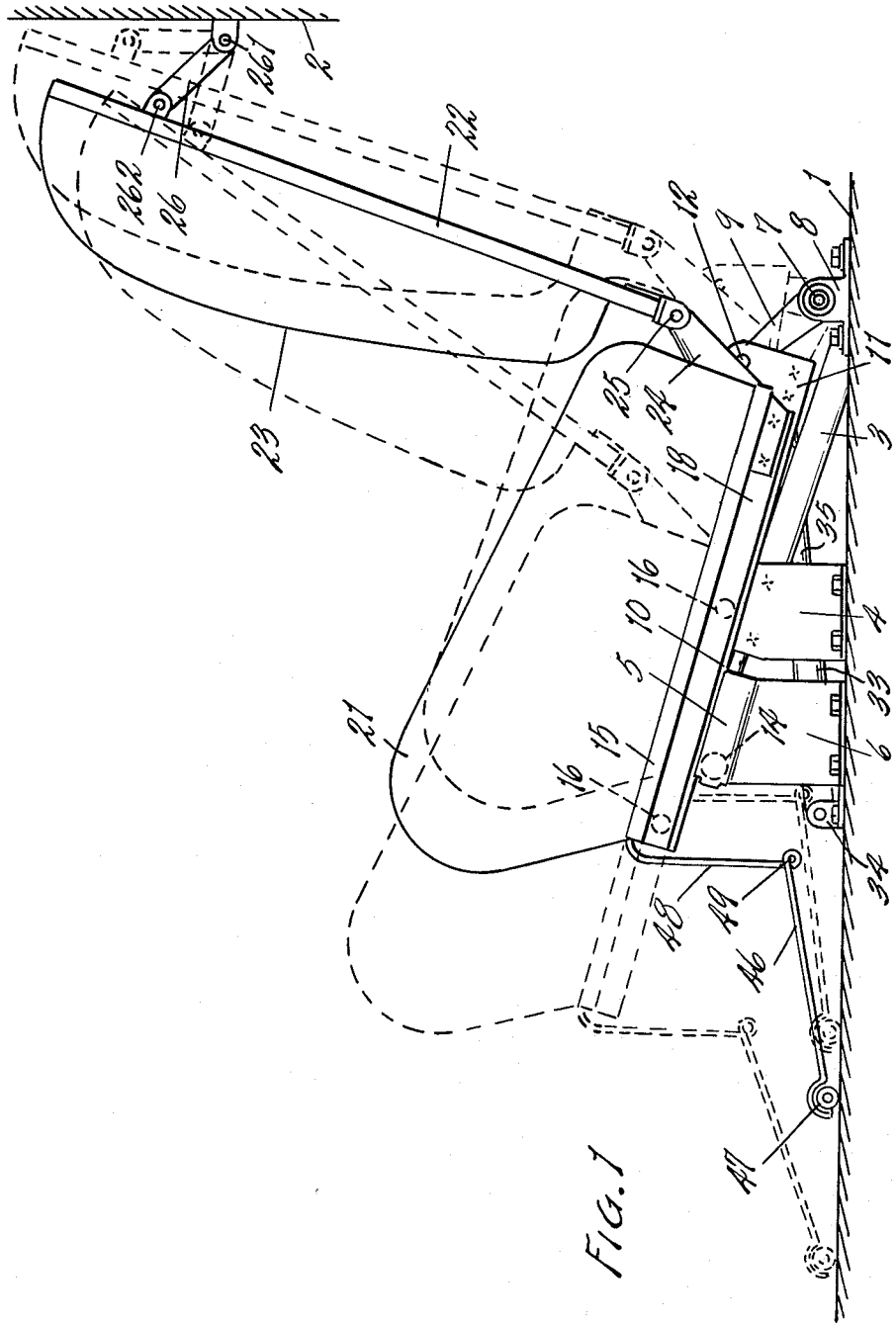
Fig. 1 is a fragmentary side elevational view of a structure embodying a preferred form of the invention, the parts being shown in an intermediate position by full lines and in fully retracted and projected positions by dotted lines.

In the accompanying drawings the invention is illustrated as embodied or adapted for use in motor vehicles such as taxis. In the drawings 1 represents the floor of a vehicle and 2 a rear wall of the seat compartment or other support. In this embodiment the rearwardly inclined base members 3 are secured at their rear ends to the floor 1 and supported at their front ends by the upright or brackets 4. Rearwardly inclined ways 5 are disposed in front of and in alignment with the base members 3, the ways being supported by the pedestals 6.

A rockshaft 7 is disposed at the rear of the base members and is supported by the bearing brackets 8 which are secured to the floor 1. This rockshaft is provided with arms 9 aligned with the base members and swingable forwardly relative thereto as is shown by dotted lines in Fig. 4, the arms 9 being shown by full lines in upright retracted position in Fig. 4. The seat carriers or carriages 10, desirably of upwardly facing channel section, are provided with upwardly projecting arms 11 at their rear ends pivotally mounted at 12 on the rocker arms 9, the rear ends of the webs of the carriers being slotted at 13 to receive the arms. These carriers are provided with rollers 14 traveling on the rearwardly inclined ways 5. When the carriers are thus mounted they move forwardly and their rear ends are swung downwardly while their upper front ends are lifted or raised so that the seat member 15 is tilted rearwardly as it moves forwardly. This is illustrated in Fig. 1 by the full and dotted line positions.

The carriers are provided with rollers 16 mounted on the journals 17, the seat member being provided with downwardly facing roller engaging ways 18. These ways have inturned flanges 19 on their edges to prevent the parts being disengaged while the ways 5 have inturned flanges 20 on their upper edges retainingly coacting with the rollers 14 on the carriers 10. The seat member 15 is in the form of a platform or base adapted to receive the seat cushion 21 conventionally illustrated in Fig. 1.

The back member 22 is adapted to receive the back cushion 23 conventionally illustrated in Fig. 1. The ways 18 on the seat member are provided with upwardly and rearwardly projecting arms 24 to which the lower end of the back member 22 is pivotally connected at 25. The upper end of the back member is supported by the swingable links 26 which are pivoted at 261 to the relatively fixed support 2 and at 262 to the back member. With the back member and seat member thus connected, the back member is raised and lowered and swings forwardly with the seat member as it is raised and lowered.

The seat member is provided with spring biasing means acting to urge it rearwardly. In the embodiment illustrated this comprises the springs 27 mounted on the rods 28 pivotally connected to the seat member at 29 as shown in Fig. 5. The rods pass through the spring abutments 30 and are provided with thrust collars 31 supported by the adjusting nuts 32 so that the springs may be tensioned. To minimize shock, dashpot types of shock absorbers are provided, the cylinder elements 33 of which are pivotally mounted on the brackets 34 attached to the floor 1, the plunger absorber member elements 35 being pivotally connected at 36 to the seat member.

To prevent oscillating movement of the seat and back when in retracted or normal position detents 37 are provided which are pivotally mounted at 38 on the carrier members and adapted to engage keepers 39 provided therefor on the seat member. These detents are biased to engaging position by the springs 40. The detents are provided with tail portions 41 which are in engagement with the arms 9 when the seat member is in retracted position as is shown in Fig. 4. However, when the seat member is subjected to sufficient shock to overcome the inertia thereof and the load it may be carrying, the resistance of the springs 27 is overcome and the front ends of the carriers move forwardly and upwardly and their rear ends are swung forwardly and downwardly. The pivot 12 pulls the arm 9 forwardly to inclined position so that the arm 9 moves rearwardly out of the slot 13 and away from the tail piece 41. This releases the tailpieces 41 of the detents and the pull of the seat member overcomes and releases the detents as is shown by dotted lines in Fig. 4. The stops 42 limit the forward travel of the carrier members but the seat member can travel and move forwardly relative to the carriers on the supports described therefor.

In the embodiment shown in Figs. 1 to 5, inclusive, the footrest 46 has rollers 47 at its front end traveling on the floor 1 and supported by the hangers 48 depending from the seat member to which the footrest is pivotally connected at 49.

In the embodiment of the invention shown in Figs. 6 to 12, inclusive, the base members 50 are provided with upwardly inclined ways 51 formed integrally therewith. In this embodiment the carrier members 52 are provided with rollers 53 at their rear ends and with rollers 54 adjacent their forward ends. The rollers 53 travel in the horizontal portions of the base member which is of channel section as shown in Fig. 9 and has inturned flanges 55 retaining the rollers, stops 56 being provided to limit the forward travel. The rollers 54 are provided with detents 57 which engage the keeper slots 58 in the seat member slides 60. When the carrier members reach their forward position as shown in full lines in Fig. 8, the detents 57 drop out of the notches or keepers 59 allowing the seat members 60 to travel forward to the fully projected position shown in Fig. 8.

In this embodiment the seat members are provided with a frame designated generally by the numeral 60' and adapted to receive the seat cushion shown conventionally at 61. The back member 62 of this embodiment is pivotally mounted at 63 on the upwardly projecting arms 64 of the carriers 52. The upper end of the back member is provided with a channeled slide 65 (see Fig. 11) coacting with the rollers 66 carried by the bracket 67 on the support 2.

In this embodiment the shock absorber is of the dashpot type, the cylinder 68 of which is pivotally connected at 69 to the bracket 70 on the seat member. The plunger member 71 is pivotally connected at 72 to a bracket 73 on the floor 1. The seat member is biased to its retracted position by means of the spring 74 which is mounted on the rod 75 pivoted at 76 on the bracket 73. The spring engages the abutment member 77 and the rod is provided with adjusting thrust nuts 78 for the front end of the spring. In this embodiment the seat member is provided with depending arms 79 on which the footrest 80 is pivotally mounted, the front end of the footrest being provided with supporting rollers 81.

In this embodiment the seat is tilted rearwardly on the forward stroke thereof as is indicated by dotted lines in Fig. 6 but not to the degree or extent of the embodiment shown in Figs. 1 to 5. This tilting of the seat is an important factor of the invention as it minimizes the likelihood of the occupant being thrown forwardly from the seat. A further advantage is that this movement does not cramp the occupant or place the occupant in an unnatural position but tends to maintain the occupant in a natural sitting position while absorbing or counteracting a major part of the inertia forces resulting from the sudden stopping of a conveyance.

While I have illustrated and described the invention in embodiments thereof especially adapted for use in motor vehicles, it is desired to point out that the same may be readily adapted for embodiment in airplanes and other vehicles subject to sudden stopping. I have not attempted to illustrate or describe certain other embodiments which I contemplate as it is believed that this disclosure will enable those skilled in the art to embody or adapt the invention as may be desired.

Having thus described my invention, what I claim as new and desire to secure by Letters Patent is:

1. In a seat structure, the combination of laterally spaced rearwardly inclined base members, rearwardly inclined ways at the front of and aligned with said base members, a rockshaft provided with arms disposed transversely at the rear ends of said base members, seat carriers provided with rollers at their front ends traveling on said ways and with upwadly projecting brackets at their rear ends pivotally mounted on said rockshaft arms, said rockshaft arms being in upright position when the carriers are in their retracted position, a seat member slidably supported on said carriers, said carriers being provided with supporting rollers for said seat member, said seat member having upwardly projecting arms at its rear end, a back member pivotally mounted at its lower end on said arms on said seat member, swingable supporting links connecting the upper end of said back member to a fixed support, spring biased detents pivotally mounted on said carriers to engage said seat member when in its retracted position, said detents being held in engaged position by said arms on said rockshaft when the seat member is in retracted position, spring supporting rods pivotally connected at their front ends to said seat member, springs disposed on said rods, abutment members for said springs whereby the springs act to yieldingly urge said seat member to its retracted position, and a dashpot shock absorber, one element of which is connected to said seat member and the other to a relatively fixed support.

2. In a seat structure, the combination of laterally spaced rearwardly inclined base members, rearwardly inclined ways at the front of and aligned with said base members, a rockshaft provided with arms disposed transversely at the rear ends of said base members, seat carriers provided with rollers at their front ends traveling on said ways and with upwardly projecting brackets at their rear ends pivotally mounted on said rockshaft arms, said rockshaft arms being in upright position when the carriers are in their retracted position, a seat member slidably supported on said carriers, said carriers being provided with supporting rollers for said seat member, said seat member having upwardly projecting arms at its rear end, a back member pivotally mounted at its lower end on said arms on said seat member, swingable supporting links connecting the upper end of said back member to a fixed support, and spring biased detents pivotally mounted on said carriers to engage said seat member when in its retracted position, said detents being held in engaged position by said arms on said rockshaft when the seat member is in retracted position.

3. In a seat structure, the combination of laterally spaced rearwardly inclined base members, rearwardly inclined ways at the front of and aligned with said base members, a rockshaft provided with arms disposed transversely at the rear ends of said base members, seat carriers provided with rollers at their front ends traveling on said ways and with upwardly projecting brackets at their rear ends pivotally mounted on said rockshaft arms, said rockshaft arms being in upright position when the carriers are in their retracted position, a seat member slidably supported on said carriers, said carriers being provided with supporting rollers for said seat member, said seat member having upwardly projecting arms at its rear end, a back member pivotally mounted at its lower end on said arms on said seat member, swingable supporting links connecting the upper end of said back member to a fixed support, spring supporting rods pivotally connected at their front ends to said seat member, springs disposed on said rods, abutment members for said springs whereby the springs act to yieldingly urge said seat member to its retracted position, and a dashpot shock absorber, one element of which is connected to said seat member and the other to a relatively fixed support.

4. In a seat structure, the combination of laterally spaced rearwardly inclined base members, rearwardly inclined ways at the front of and aligned with said base members, a rockshaft provided with arms disposed transversely at the rear ends of said base members, seat carriers provided with rollers at their front ends traveling on said ways and with upwardly projecting brackets at their rear ends pivotally mounted on said rockshaft arms, said rockshaft arms being in upright position when the carriers are in their retracted position, a seat member slidably supported on said carriers, said carriers being provided with supporting rollers for said seat member, said seat member having upwardly projecting arms at its rear end, a back member pivotally mounted at its lower end on said arms on said seat member, and swingable supporting links connecting the upper end of said back member to a fixed support.

5. In a seat structure, the combination of laterally spaced rearwardly inclined base members, rearwardly inclined ways at the front of and aligned with said base members, a rockshaft provided with arms disposed transversely at the rear ends of said base members, seat carriers provided with rollers at their front ends traveling on said ways and with upwardly projecting brackets at their rear ends pivotally mounted on said rockshaft arms, said rockshaft arms being in upright position when the carriers are in their retracted position, a seat member slidably supported on said carriers, said carriers being provided with supporting rollers for said seat member, said seat member having upwardly projecting arms at its rear end, a back member pivotally mounted at its lower end on said arms on said seat member, swingable supporting links connecting the upper end of said back member to a fixed support, footrest hangers depending from the front of said seat member, and a footrest slidably supported at its front end and pivotally mounted on said hangers.

6. In a seat structure, the combination of a rearwardly inclined base member, rearwardly inclined ways at the front of said base member, swingably supported arms having fixed pivotal connections located rearwardly of said ways, seat carriers slidable on said ways and pivotally mounted at their rear ends on said arms, said arms being in upright position when the carriers are in their retracted position, a seat member supported on said carriers and slidable thereon forwardly and backwardly, a back member connected at its lower end to said seat member, and detents on said carriers engaging said seat member when in its retracted position, said detents being held in engaged position by said arms when the seat member is in retracted position.

7. In a vehicle, a forwardly facing seat structure comprising fixed rearwardly inclined ways, swingable arms having fixed pivotal supports located at the rear of said ways, seat carriers freely slidable on said ways and pivotally mounted at their rear ends on said arms, a seat member supported on said carriers and freely slidable thereon forwardly and backwardly, a back member connected at its lower end to said seat member, means acting to bias said seat member to retracted position, footrest hangers depending from the front of said seat member, and a footrest slidably supported at its front end and pivotally mounted on said hangers.

8. In a seat cushion and back assembly, the combination of a seat member and a back member connected to the rear end thereof, means for slidably supporting said seat member along a forwardly rising surface, other means slidably and tiltably supporting said first means and including a link having a fixed pivotal connection at its lower end and a pivotal connection at its upper end to said first means whereby the forward end of said seat member is raised and its rear end lowered on the forward movement of the seat member, a detent engageable between said seat member and said first means for holding said seat member in its retracted position on said first means and positioned to be engaged by said link and to be released therefrom on the forward swinging movement of said second means, and a spring acting to bias the seat member to retracted position.

9. In a vehicle, a forwardly facing seat structure comprising a support including rearwardly declining ways, a seat member freely slidably supported on said ways, swingable supporting arms connected to the rear end of said seat member and supporting the same in upright position of said arms at the rearward position of said seat member, a back member pivotally connected at its lower end to said seat member and pivotally and vertically movably supported at its upper end, a spring connected between said seat and a fixed anchor for biasing said seat member to its retracted position, and a shock absorber connected between said seat and a fixed anchor for checking the retracted movement of the seat member.

10. In a vehicle, a forwardly facing seat structure comprising a support including rearwardly declining ways, a seat member freely slidably supported on said ways, a swingable support for the rear end of said seat member, a spring for biasing said seat member to its retracted position, a shock absorber for checking the movement of the seat member, and a footrest slidably supported at its front end and having supporting connections with said seat member at its rear end.

11. In a vehicle, a forwardly facing seat structure comprising a support including rearwardly declining ways, a seat member freely slidably mounted on said support and having travelers at its front engaging said rearwardly inclined ways whereby the seat is tilted rearwardly as it moves forwardly on the ways, a back member connected at its lower end to said seat member and vertically movably and tiltably supported from a fixed point at its upper end, a spring acting to bias said seat member to its retracted position, and a shock absorber operatively associated with said seat member and acting to check the movement thereof.

12. Adjustable seat structure comprising, a support having an upwardly inclined forward portion, a carrier slidably supported at its forward end on said inclined portion and slidably supported at its rear end on the rear of said support, a seat supported on said carrier and slidable forwardly thereon, and an automatically disengageable lock member engageable between said carrier and said seat member to prevent relative movement therebetween, said lock member engaging said support in the rearward adjusted position of said carrier to prevent disengagement of said lock member.

13. In a structure of the class described, the combination of rearwardly declining ways, a seat carrier member having its front end slidably supported on the declining portion of said ways and having its rear end movably supported therebehind for forward and rearward movement, a seat member slidably supported on said carrier member for forward and rearward movement thereon, a lock carried by said carrier member and engageable with said seat member when said seat member is in its rearmost position on said carrier member to prevent forward movement of the seat member on the carrier member, stop means engageable with said lock in the rearmost position of said carrier member and operative to hold said lock engaged with said seat member, said lock being biased toward disengagement from said seat member to release said seat member when said lock and said carrier member move forwardly from said stop means, and a back pivotally connected at its lower end to the back of one of said members and having a vertically movable and swingable supporting connection at its upper end to a fixed support.

14. In a structure of the class described, the combination of rearwardly declining ways, a seat carrier member having its front end slidably supported on the declining portion of said ways and having its rear end movably supported therebehind for forward and rearward movement, a seat member slidably supported on said carrier member for forward and rearward movement thereon, a lock carried by one of said members and engageable with the other of said members when said seat member is in its rearmost position on said carrier member to prevent forward movement of the seat member on the carrier member, and stop means engageable with said lock in the rearmost position of said carrier member and operative to hold said lock engaged, said lock being biased toward disengagement to release said seat member when said lock and said carrier member move forwardly from said stop means.

15. In a structure of the class described, the combination of rearwardly declining ways, a seat carrier member having its front end slidably supported on the declining portion of said ways and having its rear end movably supported therebehind for forward and rearward movement, a seat member slidably supported on said carrier member for forward and rearward movement thereon, a lock carried by one of said members and engageable with the other of said members when said seat member is in its rearmost position on said carrier member to prevent forward movement of the seat member on the carrier member, and stop means engageable with said lock in the rearmost position of said carrier member and operative to hold said lock engaged, said lock being biased toward disengagement to release said seat member when said lock and said carrier member move forwardly from said stop means, and a foot rest having its rear edge pivotally supported at the bottom of the front edge of said seat to slide the foot rest forwardly and rearwardly with the seat.

References Cited in the file of this patent

UNITED STATES PATENTS

| | | |
|---|---|---|
| 290,634 | Evesson | Dec. 18, 1883 |
| 1,240,192 | French | Sept. 18, 1917 |
| 1,246,209 | Witter | Nov. 13, 1917 |
| 1,414,637 | Gell | May 2, 1922 |
| 1,964,519 | Knudson | June 26, 1934 |
| 2,064,536 | Grinnell | Dec. 15, 1936 |
| 2,102,979 | Smith | Dec. 21, 1937 |
| 2,161,367 | McGregor et al. | June 6, 1939 |
| 2,272,536 | Votypka | Feb. 10, 1942 |
| 2,466,345 | Wyeth | Apr. 5, 1949 |
| 2,473,895 | Mednick | June 21, 1949 |
| 2,563,629 | Watter | Aug. 7, 1951 |
| 2,568,930 | Parsons | Sept. 25, 1951 |
| 2,573,077 | White et al. | Oct. 30, 1951 |

FOREIGN PATENTS

| | | |
|---|---|---|
| 50,020 | France | Aug. 1, 1939 |
| 353,412 | Great Britain | July 20, 1931 |
| 433,892 | Great Britain | Aug. 22, 1935 |
| 619,086 | Germany | Sept. 21, 1935 |
| 720,801 | Germany | May 15, 1942 |